United States Patent [19]

Nara et al.

[11] 3,828,685

[45] Aug. 13, 1974

[54] ROUTE CONTROL SYSTEM FOR GUIDED VEHICLES AND THE LIKE

[75] Inventors: Akinao Nara; Michio Hara, both of Kodaira; Seiichi Kanema; Minoru Kano, both of Hachioji, all of Japan

[73] Assignee: Hitachi, Ltd., Tokyo, Japan

[22] Filed: Sept. 28, 1972

[21] Appl. No.: 293,039

[30] Foreign Application Priority Data
Sept. 29, 1971 Japan.............................. 46-75457

[52] U.S. Cl................................. 104/130, 104/105
[51] Int. Cl............................................ E01b 25/06
[58] Field of Search.... 104/88, 96, 105, 130, 172 B, 104/244.1

[56] References Cited
UNITED STATES PATENTS

| | | | |
|---|---|---|---|
| 3,118,392 | 1/1964 | Zimmerman................. | 104/88 |
| 3,338,178 | 8/1967 | Jones.............................. | 104/130 |
| 3,593,665 | 7/1971 | Marty............................. | 104/88 |
| 3,662,688 | 5/1972 | Desilets......................... | 104/130 |

Primary Examiner—M. Henson Wood, Jr.
Assistant Examiner—D. W. Keen
Attorney, Agent, or Firm—Craig & Antonelli

[57] ABSTRACT

A route control system for guided vehicles and the like in which a guiding member provided on the guided vehicle is inserted into a guiding groove provided along a roadbed on which the guided vehicle is to be driven and a side wall of the guiding groove imparts contact pressure to the guiding member, said contact pressure being detected for producing a detection signal which is utilized for controlling the route of the vehicle.

9 Claims, 17 Drawing Figures

ROUTE CONTROL SYSTEM FOR GUIDED VEHICLES AND THE LIKE

BACKGROUND OF THE INVENTION

1. Field of the Invention

This invention is relating to a route control system for guided vehicles automatically running on a road and more particularly adaptable to provide reliable and economical operations without waste of materials and energy.

2. Description of the Prior Art

Hitherto, there have been proposed generally two route control systems for guided vehicles, one is a guiding line system and the other is a guiding groove system.

Figure 1:
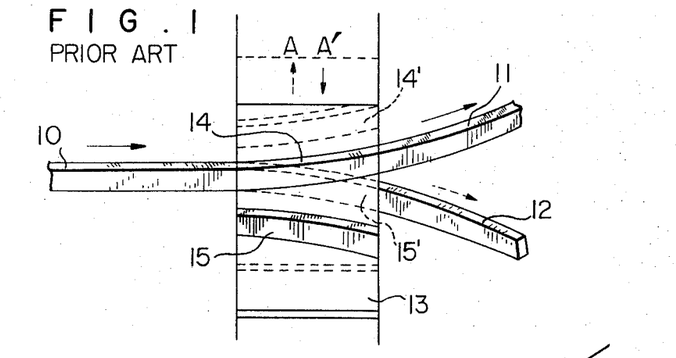
FIG. 1 is a schematic drawing showing a guiding line system of the prior art.

The guiding line system is schematically shown in FIG. 1, in which 10, 11 and 12 indicate guiding lines provided on roadbed, 13 a movable plate mounted movably in the directions as shown by the arrows A and A', 14 and 15 guiding lines mounted on the movable plate 13. When the movable plate 13 is at a position as shown by the full lines, guiding lines 10 and 11 communicate through the guiding line 14 thereby permitting guided vehicles (not shown) passed from the guiding line 10 to the guiding line 11. On the other hand, when the movable plate is moved upto another position as shown by the dotted lines, the guiding line 10 communicates with the guiding line 12 through the guiding line 15 thereby changing the route of guided vehicles to the path of the guiding line 12. However, this system is not applicable to traffic of vehicles which are required to keep the distances therebetween shorter because the response in operation is slow due to its massive movable portion. If the distances among vehicles become shorter and the movable plate is required to change its position more frequently, the system will possibly get out of order more frequently. Once the system has been involved in trouble, it is avoidable that the traffic is greatly affected by the trouble because the movable plate is utilized as a part of the road.

Figure 2:
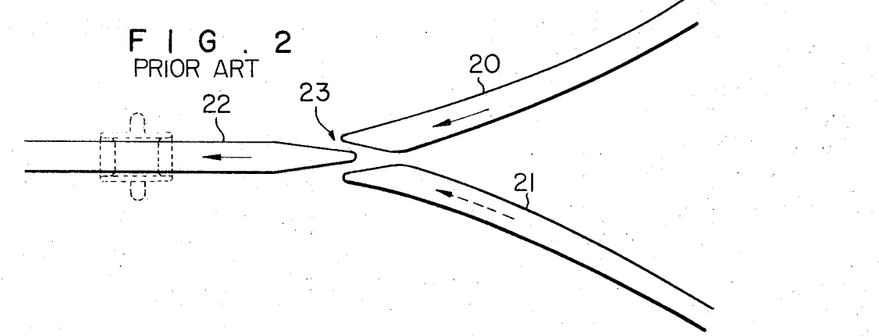
FIG. 2 is a schematic drawing showing a conjunction point of the guiding lines of the prior art.

Further, in the guiding line system, the junction point of roads generally must be constructed as shown in FIG. 2. Thus the guiding lines 20, 21 and 22 are interrupted at the junction point 23, resulting in a complicated structure. Moreover, when power lines, transmission lines and/or detecting lines are laid along the guiding lines, those lines must be interrupted at the junction point 23 or be connected below the guiding line. This will be the same if the guiding lines are utilized for the transmission and/or detecting lines as well.

Figure 3A:
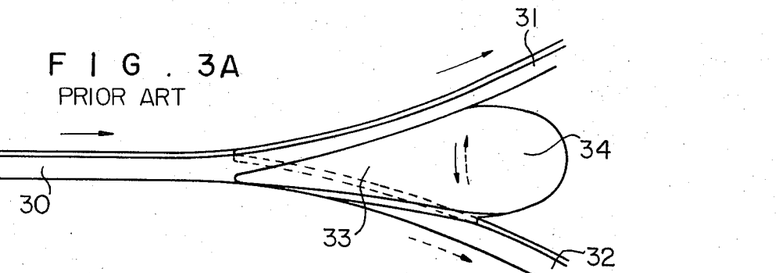
Figure 4A:
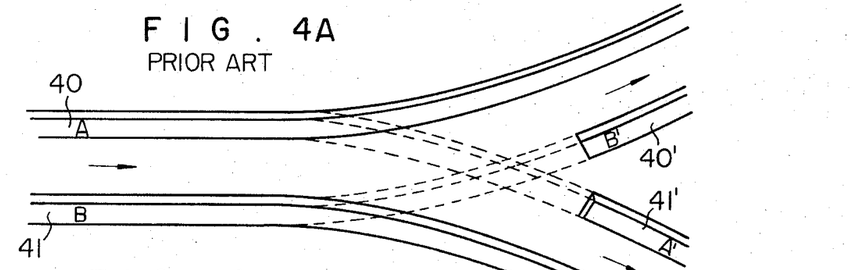

The guiding groove system is schematically shown in FIGS. 3A and 4A. FIG. 3A shows an example in which the connection of guiding grooves is changeable at the branching point and FIG. 4A shows another example in which a pair of guiding grooves are provided on each roadbed, while the vehicle is provided with a pair of guiding members corresponding to the grooves, respectively, and the route of the vehicle is determined by selectively utilizing one of the guiding members.

Figure 3B:
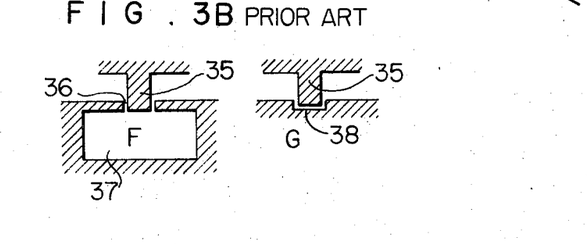

In FIG. 3A, 30, 31 and 32 indicate guiding grooves and 33 a switching road means mounted for rotation about an axis 34. When the switching roadbed 33 is turned upto a position as shown by full lines, the guiding grooves 30 and 31 are communicated, and when turned upto a position as shown by dotted lines, the guiding grooves 30 and 32 are communicated. FIGS. 3B and 3C show cross-sections of the guiding grooves. FIG. 3B shows a case in which a space 37 is provided under the guiding groove 36 for laying power lines, transmission lines or the like. FIG. 3C shows another case in which there is provided no other than a guiding groove 38. In both figures, 35 is a guiding member coupled with the guiding groove 36 or 38.

Figures 4B, 5:
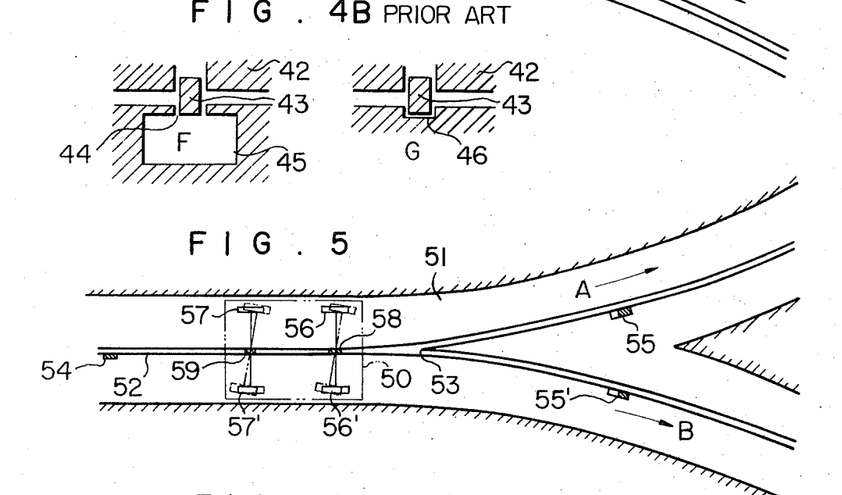

In the case as shown in FIG. 4A, the guiding grooves 40 and 40', 41 and 41' are respectively in pairs. A vehicle turns in a direction as shown by the arrow D by lowering a guiding member provided in alignment with the guiding groove 40 and in another direction as shown by the arrow E by lowering the other one provided in alignment with the guiding groove 41. FIGS. 4B and 4C show cross-sections of the guiding grooves. In these figures, 42 indicates a body of the vehicle, 43 a guiding member mounted on the body 42 and movable for up and down movement, 44 and 46 the guiding grooves, and 45 a space provided below the guiding groove 44. The space 45 is utilized for mounting power lines in the same manner as that in FIG. 3B.

The guiding groove system utilizing the switching road means as shown in FIG. 3A has primarily the same defects as those in the guiding line system, and the system utilizing a pair of guiding grooves as shown in FIG. 4A has defects such that a pair of guiding members are necessary to be movably mounted on each vehicle and if the guiding members were both lowered accidentally, the guiding members and/or the guiding grooves might be damaged and the vehicle might turn in a wrong direction or run off the road, and that if no guiding member were lowered accidentally, the vehicle might run off the road.

SUMMARY OF THE INVENTION

An object of the present invention is to provide a novel route control system for guided vehicles which obviates the defects of the prior art systems as above-mentioned.

According to the present invention, the above object is achieved by a route control system for guided vehicles comprising guiding route means provided along a roadbed on which guided vehicles are to be driven, at least one guiding member adaptable to be provided on the guided vehicle so as to be engaged with said guiding route means, means for detecting contact pressure imparted on said guiding member from said guiding route means thereby producing a detection signal, and means responsive to said detection signal for controlling the route of the vehicle.

BRIEF DESCRIPTION OF THE DRAWINGS

FIGS. 3A, 3B and 3C are schematic drawings of a guiding groove system of the prior art.

FIGS. 4A, 4B and 4C are schematic drawings of another guiding system of the prior art.

FIG. 5 is a schematic drawing showing a system of the present invention.

DESCRIPTION OF THE PREFERRED EMBODIMENTS

Referring to FIG. 5 which shows schematically the principle of the route control system for guided vehicles of the present invention, 51 indicates a roadbed, 52 a guiding groove provided on the roadbed 51, and 53 a branch point of the guiding groove 52. A vehicle 50 running on the roadbed 51 must choose one of the roads A and B at the branch point 53. Sign-posts 54, 55 and 55' stand on the roads at, for example, 15 m in advance of the branch point 53 and 5 m in the rear of the same, respectively. 58 and 59 indicate guiding members provided at the centers of wheel shafts which connect respectively front wheels 56 and 56' and rear wheels 57 and 57' of the vehicle 50. The guiding members 58 and 59 are put into the guiding groove 52 with a suitable space therebetween so as to permit the members to pass smoothly curved portions of the guiding groove. Further, if the power lines and/or the communication lines are laid in the space provided beneath the guiding groove 52 and sliding contacts are provided below the respective guiding members for electrical connection between those lines and the system in the vehicle, the center of the wheel shaft must be aligned with the guiding member 52 thereby assuring a suitable margin for the electrical connection.

On the guiding members 58 and 59, pressure sensitive elements are mounted, respectively, for detecting the pressure imparted thereon from the side walls of the guiding groove 52. The detected pressure is utilized for controlling the route of the vehicle 50. When the vehicle runs on the roadbed 51 from the left to the right side in FIG. 5, the route control of the vehicle is achieved by detecting the position of the guiding member 58 in terms of timing when it passes the positions beside the sign-posts 54 and 55 or 55' which produce frequency signals whose frequencies are different each other, changing the control of the turning direction for each of the front and rear wheels from one to another mode successively in accordance with the detected position and controlling the turning direction to cause each of the guiding members 58 and 59 to be imparted with pressure corresponding to the successively changed control mode and thereby causing the vehicle to head for a desired direction A or B.

For the control of the turning direction of the wheels are available, for example, three control modes, that is, a first control mode in which the front and rear wheels are turned to the left so as to cause the guiding members 58 and 59 to be in abutment with the left side wall of the guiding groove 52 under slight pressure, a second control mode in which the wheels are turned to the left so as to cause the guiding members 58 and 59 to be in abutment with the left side wall of the guiding groove 52 under strong pressure, and a third control mode in which the wheels are turned to the right so as to cause the guiding members 58 and 59 to be in abutment with the right side wall of the guiding groove 52 under strong pressure. The first control mode is utilized for running at straight portions of the road except for those at or near the branch points. The second control mode is utilized for directing the course to the left one of two branched roads which may be leftwards and straight roads, or straight and rightwards road, or for turning to the left in other cases. The third control mode is utilized for other than the above cases.

If the route is to be directed to the direction A in FIG. 5, the first control mode is employed until the front wheels 56 and 56' have passed beside the sign-post 54, and then the control is changed to the third control mode, which is continued until the rear wheels 57 and 57' have passed beside the sign-post 55'. It will be readily understood for those skilled in the art that the speed of teh vehicle is controlled by suitable means so that it is high in the case of running on the first control mode or straight running on the second or third control mode and it is low in other cases.

The first control mode is contributable to a fail-safe control of the route control system by maintaining the guide members 58 and 59 in abutment with the left side wall of the guiding groove 52, although it would be desirable in view of the maintenance cost if the guiding members 58 and 59 were controlled so as to be positioned at the center of the guiding groove 52 in the first control mode thereby reducing the friction loss between the guiding members 58 and 59 and the guiding groove 52 as well as the loss of slip angle of the front and rear wheels 56, 56', 57 and 57' against the roadbed 51. By utilizing the first control mode, the guide members 58 and 59 are always in contact with either one of the side walls of the guiding groove 52 at the normal state in any of the control modes and separated therefrom merely at the transient state during the change of control modes from the first to the second or third mode, or vice versa. If the pressure imparted on the guiding members 58 and/or 59 from the side wall of the guiding groove 52 reduces below a given threshold value of a period longer than a predetermined time, or if the pressure exceeds another given threshold value, the vehicle is immediately stopped.

Figure 6:
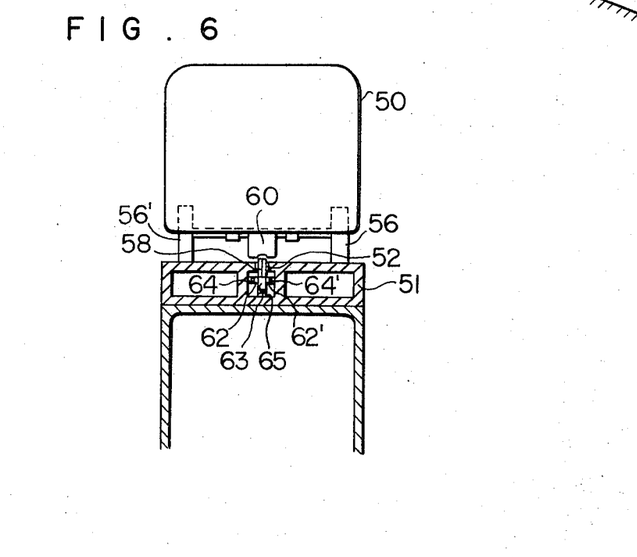
FIG. 6 is a sectional front view of a roadbed provided with the present system.

Now referring to FIGS. 6 and 7 which show schematically structure of the present system, it can be seen that the guiding groove 52 is provided on the roadbed 51 and the guiding members 58 and 59, which are mounted just below the center portions of the shafts connecting the front wheels 56 and 56', and the rear wheels 57 and 57', respectively, are inserted into the guiding groove 52 as described with reference to FIG. 5. Members 60 and 61 are provided for protection of the guiding members 58 and 59, respectively. In the embodiment shown in FIGS. 6 and 7, trolley wires 64 and 64' connected to a power source (not shown) and a trolley wire 65 for transmission or measurement are laid in a space provided underneath the guiding groove 52, while under the guiding members 58 and 59 are provided sliding members 62 and 62' in contact with the trolley wires 64 and 64' for receiving electric power and another sliding member 63 in contact with the trolley wire 65 for transmission or measurement. The structure of the guiding member and relevant parts thereto is particularly shown in FIGS. 8A and 8B. As described previously referring to FIGS. 6 and 7, the guiding member 58 is held by the member 60 and provided with a guide roller 60' which is adaptable to be in rolling contact with the wall of the guiding groove 52 as guiding the vehicle along the groove. The guiding member 58 has a rotating shaft 66 which is rotatably supported by the member 60 through a bearing 67. A pair of pressure-sensitive elements 69 and 70 are mounted movably at the left and right sides of the guiding member 58 and biased outwards by respective springs 68. The pressure-sensitive elements 69 and 70 utilize any well-known element such as a piezo electric element, a strain gauge element or the like. 71 is a mode changing signal detector which detects the time when the front wheels have just passed beside the sign-post 54, 55 or 55' and thereby produces a control mode changing signal. For example, if the sign-posts utilize low frequency induction coils, the detector may utilize a coil which is adaptable to act as a secondary coil electrically coupled with any of the induction coils when approached thereto.

Figure 7:
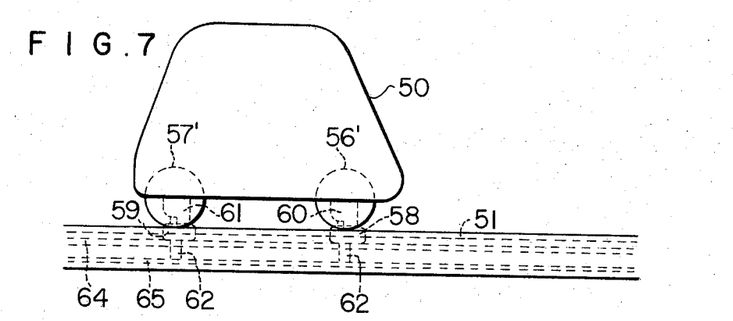
FIG. 7 is a sectional side view of the roadbed of FIG. 6.
Figure 8A:
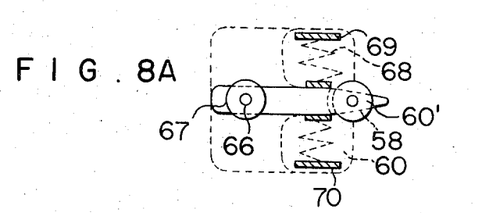
FIGS. 8A and 8B show a structure of a guiding member.
Figure 8B:
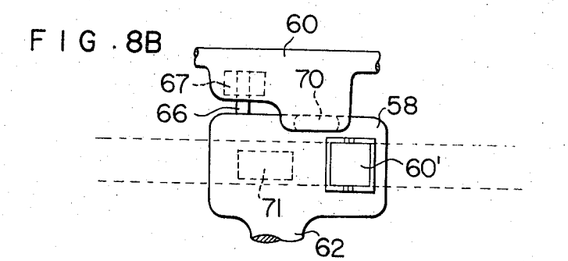
Figure 9:
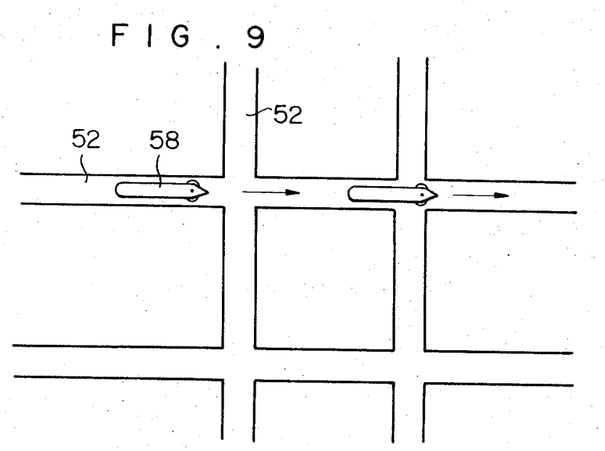
FIG. 9 is a schematic drawing for illustrating the movement of the guiding member.

The arrangement of the guide member, as above-mentioned referring to FIG. 8, is contributable to mechanically smooth movement in guiding the vehicle by the guiding member 58 even when it passes a cross-point of the guiding grooves as shown in FIG. 7.

Figure 10:
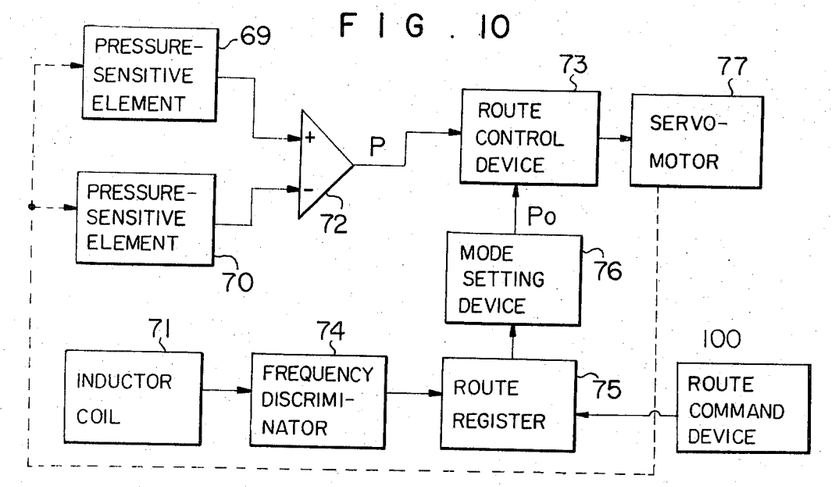
FIG. 10 is a block diagram showing an electric circuit in the route control system of the present invention.

Referring to FIG. 10 which is a circuit diagram showing operations of the present system, 69 and 70 are the pressure-sensitive elements provided on the guiding member 58 or 59 for detecting the pressure forces imparted thereon respectively from the left and right side walls of the guiding groove 52 and 71 is the inductor coil for detecting the time when the front wheels pass beside the sign-post 54, 55 or 55'. The pressure detected by the pressure-sensitive element 69 or 70 is utilized to supply a route control device 73 with an electric signal P through a subtractor 72. The inductor coil 71 induces a voltage signal having a frequency as mentioned hereinafter when it passes beside any of the sign-posts 54, 55 or 55'. The induced voltage signal is utilized to supply the route control device 73 with a control reference voltage $P_o$ corresponding thereto through a frequency discriminator 74, a route register 75, and a mode setting device 76. 77 is a servomotor mechanically connected to the front wheels 56, 56' or the rear wheels 57, 57', and driven upon receiving an output of the route control device 73.

Figure 11:
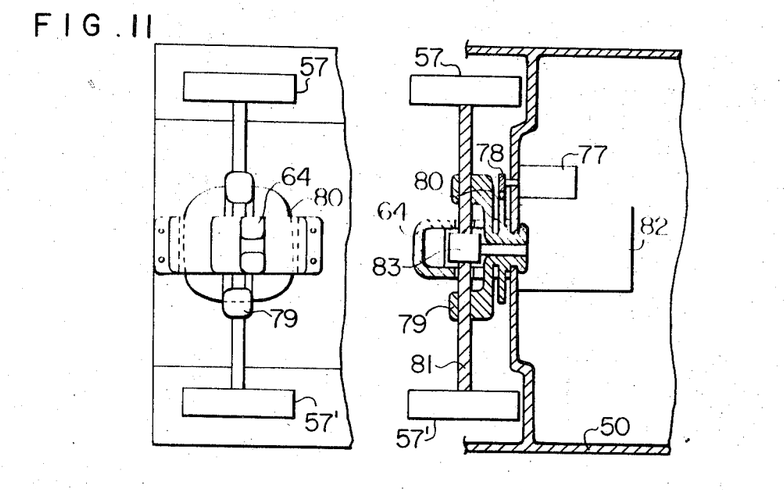
FIGS. 11A and 11B are plan and side views of a rear wheel driving control mechanism of the present system.

The electric signal P derived from the detection by the element 69 is distinguishable by its polarity from that derived from the element 70. Now assume that the electric signal P has a positive polarity when it is derived from the element 69 and a negative polarity when derived from the element 70, the value of the rotational speed Nm of the rear wheel driving motor is positive when it rotates for forward movement and negative for backward movement, and that the value of the rotational speed Ns of the servomotor 77 is positive when it causes the vehicle to turn to the left and negative when it causes the same to turn to the right. Then Ns is given by an equation $$Ns = K \cdot Nm (P - Po) \tag{1}$$

where K is a constant representing the system control gain which is selected so as to exhibit the best dynamic performance of the system. The route control device 73 produces a voltage, as a function of the signals P and Po, adapted to cause the servomotor 77 to rotate with the speed Ns as given by the equation (1). In the case of the rear wheel control, as shown in FIGS. 11A and 11B, rotation of the servomotor 77 is transmitted through a small gear 78 to a large gear 80 fixed to a shaft supporting frame 79 thereby turning the shaft 81 clockwise or counterclockwise in FIG. 11A and thereby changing the turning direction of the rear wheels 57 and 57'. The rotation of the driving motor 82 is transmitted through a differential gear 83 in a well-known manner to the respective shafts 81 and then to the wheels 57 and 57', respectively.

Figure 12:
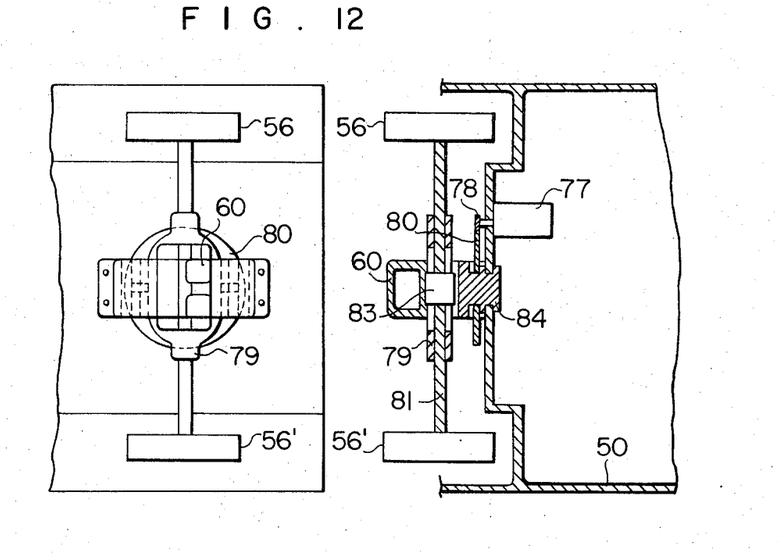
FIGS. 12A and 12B are plan and side views of a front wheel driving control mechanism of the present system.

In the case of the front wheel control, as shown in FIGS. 12A and 12B, there is no driving motor, but provided a supporting frame 84 mounted rotatably and a wheel shaft supporting frame 79 which is fixed to the supporting frame 84 in parallel to a surface perpendicular to the rotating shaft of the frame 84.

Thus, the turning angle ΔQ of the wheel shaft of the wheels 56 and 56' or 57 and 57' is proportional to an integration of the speed Ns of rotation of the survomotor 77 in terms of time and the value of the signal P is given by the following equation (2) so long as the strain of the spring 68 in FIG. 8 is less than the proportional limit of the Hook's law.

$$P = Poo - K' \cdot \int Nm \cdot \Delta Q \cdot dt \tag{2}$$

Consequently, the equation (1) is modified as follows:

$$\Delta Q = K'' \int Nm \, (Poo - K' \int Nm \cdot \Delta Q \cdot dt - Po) \cdot dt \tag{3}$$

where, K' and K'' are constants determined by the elastic constant of the spring 68, the dimensions of relevant parts of the system, gear ratios of the gear mechanism and the value of K, and Poo represents a value of the signal P at t (time) = 0.

Figure 13:
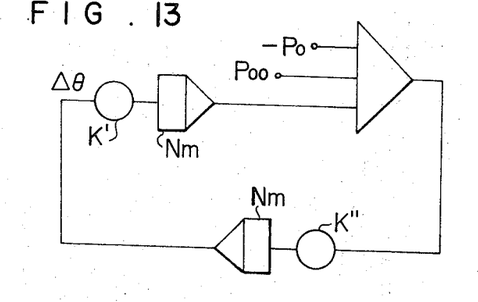
FIG. 13 is an analogous simulation circuit for route control characteristics of the system.

The equation (3) represents characteristics of a closed loop control system interconnecting between the guiding member 58 or 59 and the front or rear wheels as shown schematically by an anolog simulation circuit in FIG. 13. It can be seen from the anolog simulation circuit that the dynamic characteristics of the system are held substantially at the same state if the value Nm is changed. In other words, once the value K has been determined at a suitable value so as to obtain optimum characteristics of the system at a specific value of the speed Nm, the system exhibits the optimum characteristics even if the speed Nm is changed from the specific value.

If the absolute value of P exceeds a given threshold value, the circuit acts to separate the armature of the driving motor 82 from the power line and then short circuit the armature through a resistor for dynamic braking. Thus the fail-safe control of the system is assured during the running of the vehicle. Further if the speed of rotation of the motor 82 becomes near zero, the value of K'' in the equation (3) is changed to zero thereby preventing the value of ΔQ from being increased unnecessarily.

In FIG. 10, the control reference value Po is changed with the change in the control mode by means of the frequency discriminator 44, the route register 75 and the mode setting device 76. For example, in response to the sign-post 54, 55 or 55' beside which the vehicle passes, the mode changing signal detector 71 induces an electric signal having a specific frequency whose value is dependent upon which sign-post contributes the signal. The electric signal is applied to the frequency discriminator 74 which identifies the electric signal from its frequency as to whether the signal indicates that the road is branched or not. More particularly, the electric signal produced in response to the sign-post 54 has a frequency indicative of the road being branched and hence the frequency discriminator 74 identifies the electric signal as a signal indicating that the road is branched and thereby produces a signal corresponding to the identification, which signal in turn is applied to the register 75 in which a command signal is given previously by a route command device 100 for indicating the direction to be turned. In response to the signal from the discriminator 74, the register 75 produces the command signal indicative of the turning direction, right or left, of the vehicle, which command signal in turn is applied to the mode setting device 76. Then, the mode setting device 76 selects one of the first to third modes in accordance with the command signal and thereby supplies the route control device 73 with a control reference voltage Po having a value corresponding to the selected control mode. For example, the mode setting device selects the third control mode if the selection is resultant of the electric signal responsive to the sign-post 54. When the vehicle has advanced through the branch point 53 to the position beside the sign-post 55 or 55', the detector 71 induces an electric signal having a different frequency indicative of the road being unbranched, which electric signal is identified by the discriminator 74 from its frequency, as a result, the mode setting device selects the first control mode thereby producing a control reference voltage Po having a value corresponding to the first control mode, which voltage in turn is applied to the route control device 73.

Figure 14:
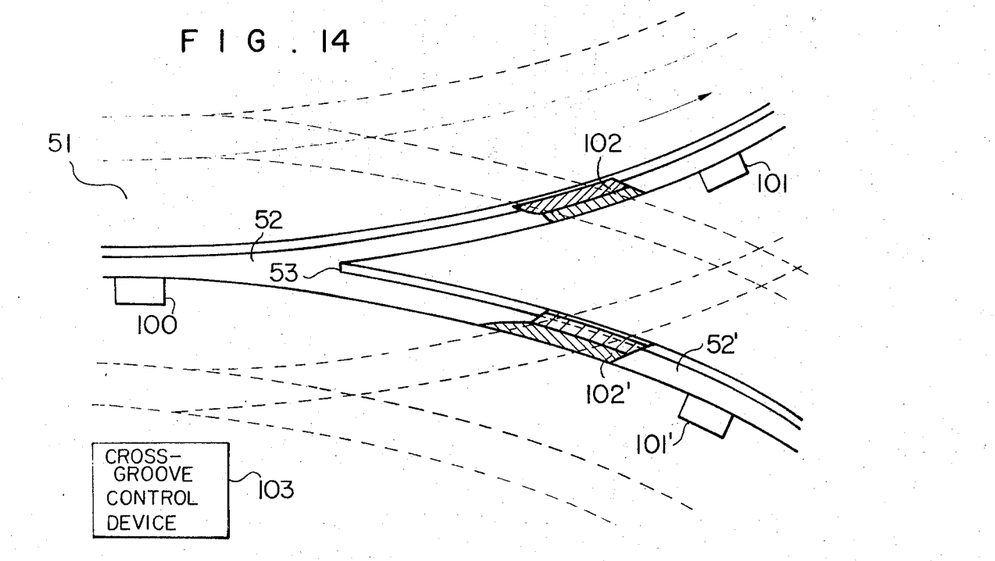
FIG. 14 is a schematic diagram showing a cross point of the guiding grooves of the present invention.

In the guiding groove system, the right or left side wheels of the vehicle drop temporarily into the guide groove at the branch point. Therefore there are provided means for avoiding trouble which otherwise might occur due to such a sudden drop of the wheels. The means is arranged as shown in FIG. 14 in which 100 indicates a passing detector located 5 meters in advance of the branch point 53 adjacent to the guiding groove 52, 101 and 101' similar passing detectors respectively located 5 meters in the rear of the branch point 53 adjacent to the respective guiding grooves, 102 and 102' cross-groove devices respectively provided at the portions of the guiding grooves intersecting with the tracks of the wheels, and 103 a cross-groove control device which receives a passing signal produced by the passing detector 100, 101 or 101' and thereby controls the cross-groove devices so as to open or close the respective guiding grooves.

When a vehicle is passing the position of the passing detector 100 as running from the left to the right on the roadbed 51, the passing detector 100 receives a passing signal from the guiding member of the vehicle by means of, for example, a primary coil of a low frequency inductor mounted on the guiding member of the vehicle, and a secondary coil thereof provided in the passing detector 100 and adaptable to induce a signal responsive to a low frequency signal produced by the primary coil. The passing signal has information as to which turning direction, right or left, the vehicle is to be directed. Such information may be presence or absence of a modulated signal prepared in the passing signal and utilized as a command signal to control the cross-groove devices. The passing signal received by the passing detector 100 is supplied to the control device 103, which identifies the command signal thereby controlling the cross-groove devices so as, for example to open the cross-groove device 102 while maintaining the cross-groove device 102' at the closing position. As a result, the right wheels of the vehicle are capable to closs the guiding groove 52' without dropping into the same. Succeedingly, the vehicle reaches the position of the passing detector 101 and then the detector 101 receives a passing signal, which in turn is supplied to the cross-groove control device 103, which causes the cross-groove device 102 to return its closing position. At the junction point are provided cross-groove devices in the same manner. However, at a cross point where two roads intersect with a right angle, there is usually provided no cross-groove device because the front or rear wheels pass across the guiding groove of the cross road substantially at the same time and in a direction vertical thereto, as a result, the shock due to the drop of wheels is relatively small.

In the above embodiment, the present invention is realized in the guiding groove system, which, however, has been described merely exemplarily and it will be apparent for those skilled in the art that other various modifications are readily thought of without departure from the scope of the present invention. For example, the vehicle may be equipped with two pressure-sensitive elements at both sides thereof so as to be in contact, respectively, with side walls of the raodbed in place of the guiding groove in the aforementioned embodiment.

The route control system for guided vehicles according to the present invention has various advantages as follows:

1. In the route control at the branch point, the operation is very fast in response because the movable parts are relatively small in size and weight. Therefore, the system is conveniently utilizable for the route control in the so-called demand vehicle traffic system in which the distance between vehicles may become shorter. Further the small number of movable parts is contributable to decreasing the occurrence of failure and also to limiting the traffic jam due to its failure to a small extent.

2. In the case of the route control system utilizing the guiding grooves, the power loss due to friction between the walls of the guiding groove and the guiding members is small and the guiding members, as well as the side walls of the groove, wear hardly because the vehicle runs with its guiding members in rolling contact with the side wall of the groove.

3. It is possible to carry out the route control with reliable and fail-safe performance, as well as small power loss due to friction between the wheels and the roadbed and small wearness thereof, by detecting the pressure imparted to the guiding members from the side wall of the guiding groove thereby changing the turning direction of the vehicle in proportional to the detected pressure and predicting the change of road condition, such as a branch point, from the detection of a specific position of the road.

4. The features as mentioned in the above paragraphs (1) to (3) are also contributable to obviating the needs for strong mechanical strength of the guiding members, and thereby making the guiding groove narrower. As a result, the cross-groove device becomes small and sometimes may be omitted and hence the interrupted portions of trolley wires for power supply or the like, which are avoidable at the branch point, junction point and cross-point, are reduced and the compensation at those portions is also easy.

5. It is possible to make the traffic of vehicles at the branch or junction point smooth because the drop of wheels into the guiding groove is prevented by means of the cross-groove devices which actuate as the guiding member detects a specific position on the road in advance of the point.

6. The system of the present invention is reliable and stable in operation, and also economical because the structure is simple, four wheels of the vehicle are always in contact with the roadbeds in running and hardly slip against the roadbed, and the turning directions of the front and rear wheels are controlled independently of each other.

We claim:

1. A route control system for guided vehicles comprising: guiding route means provided along a roadbed on which guided vehicles are to be driven, at least one guiding member adapted to be mounted on the guided vehicle so as to be engaged at all times with said guiding route means while the vehicle is being driven along the roadbed, means on board the vehicle for detecting contact pressure imparted to said guiding member from said guiding route means and producing an electrical detection signal indicative thereof, and means responsive to said electrical detection signal for controlling the route of the vehicle.

2. A route control system according to claim 1 further comprising: means provided at predetermined positions on the roadbed and each adaptable to produce a route indicating signal and means responsive to said route indicating signal for changing the mode of route control of the vehicle.

3. A route control system according to claim 1 further comprising: means provided at positions backwards and forwards of each branch point of said guiding route means for detecting the vehicle which passes any of said positions, and at least one movable device provided on a branched route means of said guiding route means and adaptable to open or close a predetermined part of said branched route means.

4. A route control system for guided vehicles comprising:
guiding route means provided along a roadbed on which guided vehicles are to be driven;
at least one guiding member for mounting on each guided vehicle for engagement at all times with said guiding route means while the vehicle is being driven along the roadbed;
first pressure sensitive means for detecting contact pressure imparted to one of two surfaces of said guiding member by said guiding route means thereby producing a first detection signal;
second pressure sensitive means for detecting contact pressure imparted to the other surface of said guiding member by said guiding route means thereby producing a second detection signal;
means for subtracting said second detection signal from said first detection signal;
servo motor means mechanically connected with wheels of said vehicle for controlling the route of the vehicle; and
control means for comparing the output signal from said subtractor means with a reference voltage for producing a control signal supplied to said servo motor means.

5. A route control system for guided vehicles according to claim 4, further comprising a plurality of route indicating means provided at predetermined positions on the roadbed and each arranged for producing a route indicating signal and changing value means responsive to said route indicating signal for changing a value of said reference voltages thereby conrolling the route of the vehicle.

6. A route control system for guided vehicles according to claim 4, further comprising a plurality of sign-post means provided at predetermined positions on the roadbed and each arranged for producing a frequency signal indicative of the road being branched, an inductor coil disposed on said guiding member of the vehicle and responsive to said frequency signal to induce a signal when the vehicle passes beside the sign-post means, a frequency discriminator for discriminating the signal induced in said inductor coil, route command device means for producing a command signal indicative of a desired turning direction of the vehicle, register means for storing the command signal from said route command device means and deriving the stored command signal upon receiving the output signal of said frequency descriminator, mode setting device means responsive to said command signal from the resistor means for selecting one of a plurality of control modes thereby to produce a mode signal, said control modes being predetermined in accordance with possible turning directions of the vehicle, and route control device means responsive to the mode signal for producing a control reference voltage having a value corresponding to the selected mode.

7. A route control system for guided vehicles according to claim 4, wherein the guiding route means includes a guiding groove defined by walls including at least two side walls extending along a roadbed on which guided vehicles are to be driven, the at least one guiding member being mounted on a shaft connecting the front wheels and the rear wheels of the vehicle and inserted into said guiding groove at all times, a guide roller being provided on the guiding member and arranged for rolling contact with one of the walls of the guiding groove for guiding the vehicle along the groove, and the first and second pressure sensitive means being a pair of pressure sensitive elements mounted movably on the guiding member and being in contact with said side walls, respectively, with biasing forces by respective springs thereby to produce the first and second detection signals responsive to contact pressure imparted thereon by said side walls respectively.

8. A route control system for guided vehicles according to claim 7, wherein trolley wires connected to a power source are provided underneath the guiding groove and supply the vehicle with electric power.

9. A route control system for guided vehicles according to claim 7, further comprising means for producing reference voltages supplied to said control means and corresponding to a first control mode in which the vehicle is turned to the left so as to cause the guiding member to be in contact with one of said side walls of the guiding groove under slight pressure, a second control mode in which the vehicle is turned to the left so as to cause the guiding member to be in contact with said one side wall under strong pressure and a third control mode in which the vehicle is turned to the right so as to cause the guiding member to be in contact with the other of said side walls under strong pressure.

* * * * *